United States Patent Office.

JAMES SPENCE, OF NEWCASTLE-UPON-TYNE, GREAT BRITAIN, ASSIGNOR TO JOHN CHALMERS, OF NEW YORK CITY.

*Letters Patent No. 96,738, dated November 9, 1869.*

IMPROVED COMPOSITION FOR PREVENTING RADIATION AND CONDUCTION OF HEAT.

The Schedule referred to in these Letters Patent and making part of the same.

I, JAMES SPENCE, of Newcastle-upon-Tyne, in the Kingdom of Great Britain, have invented a Non-Conducting Composition, of which the following is a specification.

Nature and Objects of the Invention.

The nature of my invention consists of a composition, the ingredients of which are argillaceous earth, fish, or train oil, or other equivalent oily or fatty matter, animal hair, or other fibrous material, and carbonaceous matter, these four ingredients being used alone or with other substances named hereafter, the composition to be applied as a coating to steam-boilers, steam-cylinders, steam-pipes, and other vessels or bodies, for the prevention of the radiation of heat, and also for protecting pipes, vessels, &c., containing fluids or liquids against the external action of extreme cold.

General Description.

For coating steam-boilers and other vessels subjected to a great heat, I prepare my composition in the following manner:

I take, say one thousand pounds of argillaceous earth, and grind or beat it up, and mix it with water, so as to render the mass of a pasty consistency. To this I add about three gallons of fish-oil, or equivalent oily or fatty matter, and then introduce about twenty pounds of animal hair, and about twenty-four pounds of soot.

In preparing the above, I take about twenty-four pounds of pulverized oil-cake, and about three pounds of bone-dust or bone-ash may be added to the other ingredients, which will increase the value of the composition.

These are thoroughly combined together, and form a plaster or composition which may be applied to surfaces by hand or with a trowel, as ordinary plaster is applied to walls.

A composition suitable for steam-pipes, steam-engine cylinders, and other like objects, may be made by using the same weight (one thousand pounds) of argillaceous earth, diminishing the quantity of fish-oil, or its equivalent, to two gallons, and increasing the quantity of animal hair to about thirty-six pounds, and using about fourteen pounds of soot, or other carbonaceous matter, to which may be added about fourteen pounds of bone-dust.

For a finishing coat, the composition may be prepared as follows:

One thousand pounds of argillaceous earth, one and a half gallon of fish-oil, or its equivalent, thirty-two pounds of animal hair, about half a gallon of linseed-oil, twenty-four pounds of ground charcoal, and about eight pounds of glue, and to these may be added about eight pounds of coloring-matter.

Steam-boilers may be coated whilst in use, and the composition may be applied by hand or trowel to a depth of three-quarters of an inch, or thereabout, and then scored or grained across, and allowed to dry preparatory to the application of one or more additional coats.

After the application of the first coat, care should be taken to prick it through in a sufficient number of places, in order to allow the air and moisture to escape freely when drying, this being essential in order to insure close adhesion of the composition to the surface.

Having thus described the nature of my said invention,

What I claim therein as new, and desire to secure by Letters Patent, is—

The composition herein described, composed of the ingredients or elements set forth, or the equivalents thereof, upon the principle, in the manner, and for the purposes herein set forth.

JAS. SPENCE.

Witnesses:
DANIEL GREEN,
JOHN WOOD CHERRY.